US 7,856,835 B2

(12) United States Patent
Ida

(10) Patent No.: US 7,856,835 B2
(45) Date of Patent: Dec. 28, 2010

(54) HOT WATER SUPPLY APPARATUS

(75) Inventor: Satoshi Ida, Maebashi (JP)

(73) Assignee: Sanden Corporation, Isesaki-Shi, Gunma (JP)

( * ) Notice: Subject to any disclaimer, the term of this patent is extended or adjusted under 35 U.S.C. 154(b) by 465 days.

(21) Appl. No.: 12/045,842

(22) Filed: Mar. 11, 2008

(65) Prior Publication Data

US 2009/0250203 A1 Oct. 8, 2009

(30) Foreign Application Priority Data

Mar. 22, 2007 (JP) ............................. 2007-075047

(51) Int. Cl.
*F25D 21/00* (2006.01)
*F25B 49/00* (2006.01)
(52) U.S. Cl. ............................ 62/150; 62/183; 62/228.4
(58) Field of Classification Search .................. 62/80, 62/150, 181, 183, 228.4, 331
See application file for complete search history.

(56) References Cited

U.S. PATENT DOCUMENTS

| 3,922,876 | A | * | 12/1975 | Wetherington et al. | ......... | 62/180 |
| 5,052,186 | A | * | 10/1991 | Dudley et al. | .................. | 62/79 |
| 2005/0022542 | A1 | * | 2/2005 | Sakakibara | ................... | 62/183 |
| 2007/0199337 | A1 | * | 8/2007 | Otake et al. | .................... | 62/183 |

FOREIGN PATENT DOCUMENTS

JP 2006-010145 12/2006

* cited by examiner

*Primary Examiner*—Marc E Norman
(74) *Attorney, Agent, or Firm*—Banner & Witcoff, Ltd.

(57) ABSTRACT

The present invention provides a hot water supply apparatus capable of reducing energy consumption. That is, except during operation of heating water, when a detection temperature of a temperature sensor becomes equal to or lower than a set temperature, a circulating pump is operated and a compressor is operated at a second operating frequency having a lower frequency than a first operating frequency, thereby the compressor does not have to be repeatedly operated and stopped, and can be continuously operated in a state of reduced heating power.

2 Claims, 2 Drawing Sheets

HOT WATER SUPPLY APPARATUS

CROSS REFERENCE TO RELATED APPLICATIONS

This application claims the benefit under 35 U.S.C. §110 of the prior filed Japanese Patent Application No. 2007-075047, which was filed on Mar. 22, 2007. This application is incorporated herein by reference.

BACKGROUND OF THE INVENTION

1. Field of the Invention

The present invention relates to a hot water supply apparatus including a high-pressure side heat exchanger connected to a refrigerant circuit and a hot water storage tank for storing hot water heated in the high-pressure side heat exchanger.

2. Description of the Related Art

Conventionally, there have been known hot water supply apparatuses of such type that include: a refrigerant circuit having an electric compressor, a high-pressure side heat exchanger, an expansion mechanism and a low-pressure side heat exchanger; a hot water storage tank for storing hot water; a circulation circuit having a supply pipe for connecting the hot water storage tank and a water inflow side of the high-pressure side heat exchanger, and a return pipe for connecting a water outflow side of the high-pressure side heat exchanger and the hot water storage tank; and a circulating pump provided in the circulation circuit.

In this hot water supply apparatus, generally, the circulation circuit is often laid outdoors, and water within the circulation circuit may freeze when operation of heating water to store hot water in the hot water storage tank is stopped at a low ambient temperature such as in the winter. Then, there is known a system adapted to perform operation of preventing freezing that prevents freezing in a manner that, when an ambient temperature becomes equal to or lower than a predetermined temperature, the circulating pump is operated to circulate water within the circulation circuit, and the compressor is operated to heat the water circulating within the circulation circuit.

However, in a conventional hot water supply apparatus, during operation of preventing freezing, the compressor is operated at the same rotation speed as that during operation of heating water, and the compressor is stopped when a temperature of water circulating within the circulation circuit becomes equal to or higher than a first predetermined temperature, and the compressor is operated when the temperature of water circulating within the circulation circuit becomes lower than a second predetermined temperature equal to or lower than the first predetermined temperature, so that the compressor is repeatedly operated and stopped, which presents a problem of increased power consumption.

BRIEF SUMMARY OF THE INVENTION

An object of the present invention is to provide a hot water supply apparatus capable of reducing energy consumption.

The present invention, to achieve the object described above, provides a hot water supply apparatuses including: an electric compressor; a high-pressure side heat exchanger; an expansion mechanism; a low-pressure side heat exchanger; a refrigerant circuit to which the compressor, the high-pressure side heat exchanger, the expansion mechanism and the low-pressure side heat exchanger are connected; a hot water storage tank for storing hot water; a circulation circuit having a supply pipe for connecting the hot water storage tank and a water inflow side of the high-pressure side heat exchanger, and a return pipe for connecting a water outflow side of the high-pressure side heat exchanger and the hot water storage tank; a circulating pump provided in the circulation circuit; a temperature sensor for detecting a temperature in a space where the circulation circuit is installed; and a controller for operating the circulating pump and operating the compressor at a rotation speed for operation of preventing freezing lower than a rotation speed region of the compressor during operation of heating water when a detection temperature of the temperature sensor becomes equal to or lower than a predetermined temperature, except during operation of heating water to store hot water heated in the high-pressure side heat exchanger, in the hot water storage tank.

Accordingly, during operation of preventing freezing, the compressor is operated at the rotation speed for operation of preventing freezing having a lower rotation speed than the rotation speed region of the compressor during operation of heating water, so that the compressor does not have to be repeatedly operated and stopped, and the compressor is continuously operated in a state of reduced heating power. Therefore, the compressor can be continuously operated in a state of reduced heating power without repeating operation and stop of the compressor, which allows for reduction in energy consumption.

The object described above and another object, features, and advantages of the present invention will be clear from the following description and the accompanying drawings.

DETAILED DESCRIPTION OF THE INVENTION

Figure 1:
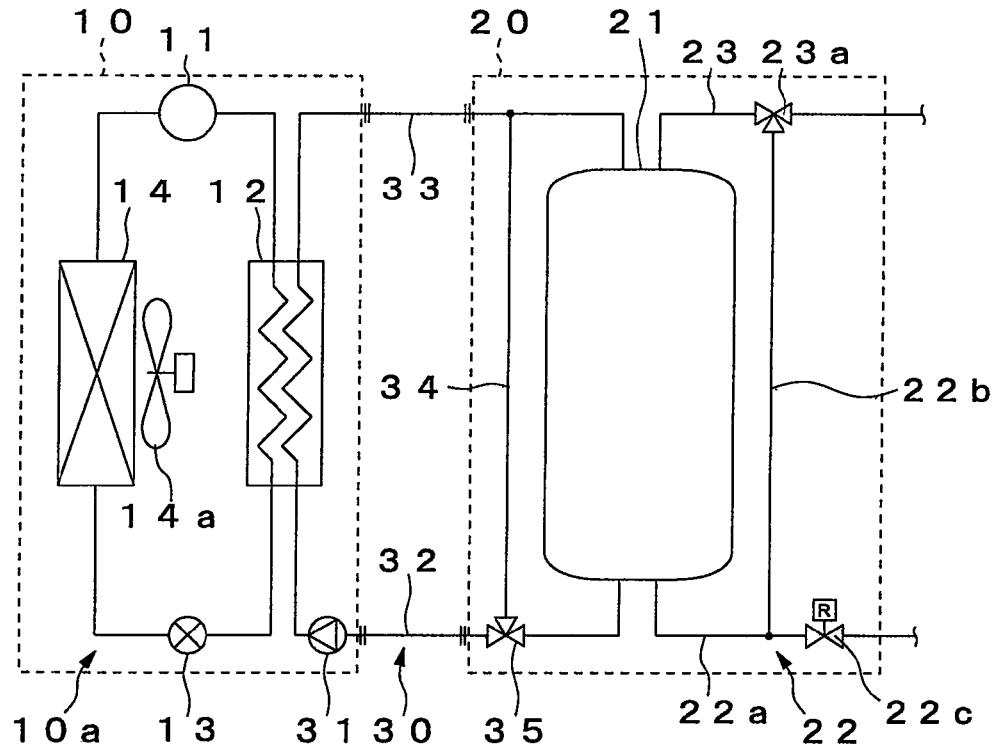
FIG. 1 is a schematic view illustrating a general configuration of a hot water supply apparatus according to one embodiment of the present invention.
Figure 2:
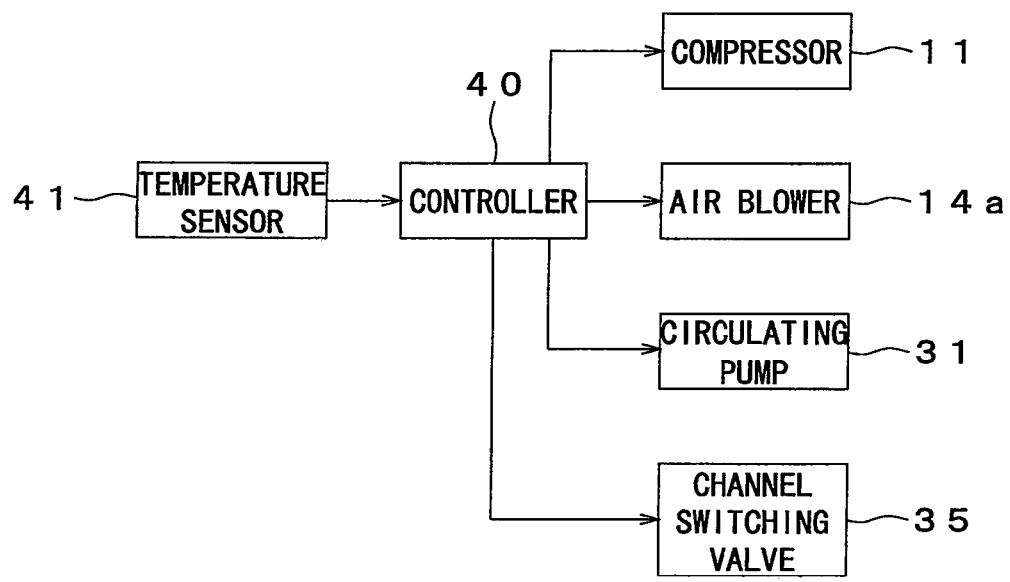
FIG. 2 is a block diagram illustrating a control system.

The hot water supply apparatus includes: a heat pump unit 10 for heating water; a hot water storage tank unit 20 for storing hot water heated in the heat pump unit 10; a circulation circuit 30 for heating, in the heat pump unit 10, water stored in the hot water storage tank unit 20 and then returning the water to the hot water storage tank unit 20; and a controller 40 for controlling an operation state.

The heat pump unit 10 includes: an electric compressor 11; a gas cooler 12 serving as a high-pressure side heat exchanger; an expansion valve 13 serving as an expansion mechanism; and an evaporator 14 serving as a low-pressure side heat exchanger. In the heat pump unit 10, the compressor 11, the gas cooler 12, the expansion valve 13 and the evaporator 14 are connected in sequence to each other with a pipe of copper, stainless steel or the like, thereby a refrigerant circuit 10a is configured. Also, the refrigerant circuit 10a is filled with carbon dioxide that turns into a supercritical state on the high-pressure side, as refrigerant. Further, in the evaporator 14, an air blower 14a is provided that sends air for heat exchange with the refrigerant. Further, in the compressor 11, a motor as driving force is provided in a manner that operating frequency thereof can be changed by inverter control or the like, and the motor is operated during operation of heating water in a range of a first operating frequency (for example, from 40 Hz to 100 Hz), and during operation of preventing freezing, the motor is operated in a range of a second operating frequency having a lower frequency than the first operating frequency (for example, from 20 Hz to 30 Hz).

The hot water storage tank unit 20 includes: a hot water storage tank 21 formed in a cylindrical shape whose upper end and lower end are closed, and which extends up and down; a water supply pipe 22 for supplying water to the hot water storage tank 21; and a hot water supply pipe 23 for supplying hot water stored in the hot water storage tank 21 to a bathroom, a kitchen and the like.

The hot water storage tank 21 is formed of a member of stainless steel or the like, and an outside thereof is covered with heat insulating material such as glass wool or urethane foam, and heat transfer between the inside and the outside is blocked.

The water supply pipe 22 has a first water supply pipe 22a connected to the lower portion of the hot water storage tank 21 and a second water supply pipe 22b connected to a mixing valve to be described below. Further, in the water supply pipe 22 situated upstream of the first water supply pipe 22a and the second water supply pipe 22b, a pressure reducing valve 22c is provided that depressurizes water supplied from waterworks to a predetermined pressure and sends it.

The hot water supply pipe 23 is connected to the upper portion of the hot water storage tank 21, and by a pressure generated by water flowing into the lower portion of the hot water storage tank 21 from the first water supply pipe 22a, hot water in the upper portion of the hot water storage tank 21 is circulated. Further, to the hot water supply pipe 23, the second water supply pipe 22b is connected through an electric mixing valve 23a, and hot water flowing out of the hot water storage tank 21 and water flowing in the second water supply pipe 22b are mixed with each other, and circulated.

The circulation circuit 30 is configured by connecting the lower portion of the hot water storage tank 21, a circulating pump 31, the gas cooler 12 and the upper portion of the hot water storage tank 21 in turn to each other with a copper pipe or a stainless steel pipe, and water in the lower portion of the hot water storage tank 21 flows into the upper portion of the hot water storage tank 21 through the gas cooler 12 by driving of the circulating pump 31. Further, the circulation circuit 30 has a supply pipe 32 and a return pipe 33 for connecting the heat pump unit 10 and the hot water storage tank unit 20. Further, on the inflow side and the outflow side of the hot water storage tank 21 of the circulation circuit 30, a bypass pipe 34 for bypassing the hot water storage tank 21 to circulate water is connected, and a channel of the circulation circuit 30 is switched to the side of the hot water storage tank 21 or to the side of the bypass pipe 34 by a channel switching valve 35 formed of a three-way valve.

The controller 40 includes a microcomputer, and a memory thereof stores a program associated with operation of heating water and operation of preventing freezing and the like. To the controller 40, the compressor 11, the air blower 14a, the circulating pump 31, the channel switching valve 35 and a temperature sensor 41 for detecting the outside temperature are connected. The controller 40 receives a detection signal of the temperature sensor 41, and sends an output signal corresponding to the detection signal of the temperature sensor 41 to the compressor 11, the air blower 14a, the circulating pump 31 and the channel switching valve 35.

When the hot water supply apparatus configured in a way described above is operated for heating water using power such as midnight power, the circulation circuit 30 is set by the channel switching valve 35 to be on the side of the hot water storage tank 21, and the compressor 11, the air blower 14a and the circulating pump 31 are operated. At this time, the compressor 11 is operated at the first operating frequency. Accordingly, the refrigerant discharged from the compressor 11 passes through the gas cooler 12 to radiate heat, and subsequently flows into the evaporator 14 through the expansion valve 13 to absorb heat, and the refrigerant flowing out of the evaporator 14 is sucked into the compressor 11. Further, water in the lower portion of the hot water storage tank 21 is circulated within the circulation circuit 30 by the circulating pump 31, and heated by heat exchange with the refrigerant in the gas cooler 12, and stored in the upper portion of the hot water storage tank 21. The compressor 11, the air blower 14a and the circulating pump 31 are stopped when hot water at a preset temperature is stored in the hot water storage tank 21 by a predetermined amount.

Further, when a handle of a faucet in a bathroom or a kitchen is operated by a user, hot water in the upper portion of the hot water storage tank 21 flows in the hot water supply pipe 23, and is mixed with water flowing in the second water supply pipe 22b in the mixing valve 23a, and supplied from the faucet to the user. When hot water in the hot water storage tank 21 is consumed, water flows from the first water supply pipe 22a into the hot water storage tank 21, so that the hot water storage tank 21 is always fully filled with water.

Further, when an outside temperature is low such as during the winter season, and operation of heating water is not performed, then the remaining water in the circulation circuit 30 may freeze. Accordingly, when operation of heating water is not performed, and an outside temperature becomes equal to or lower than a preset temperature (for example, 3° C.), then operation of preventing freezing is performed. When operation of preventing freezing is performed, the circulation circuit 30 is set to be on the side of the bypass pipe 34 by the channel switching valve 35, and the compressor 11, the air blower 14a and the circulating pump 31 are operated. At this time, the compressor 11 is operated at the second operating frequency having a lower frequency than the first operating frequency, so that the gas cooler 12 is brought into a state of lowered heating power. Further, water within the circulation circuit 30 is heated by heat exchange with the refrigerant in the gas cooler 12, and subsequently flows in the bypass pipe 34 without flowing into the hot water storage tank 21, and repeatedly heated in the gas cooler 12, thereby water within the circulation circuit 30 is prevented from freezing.

Figure 3:
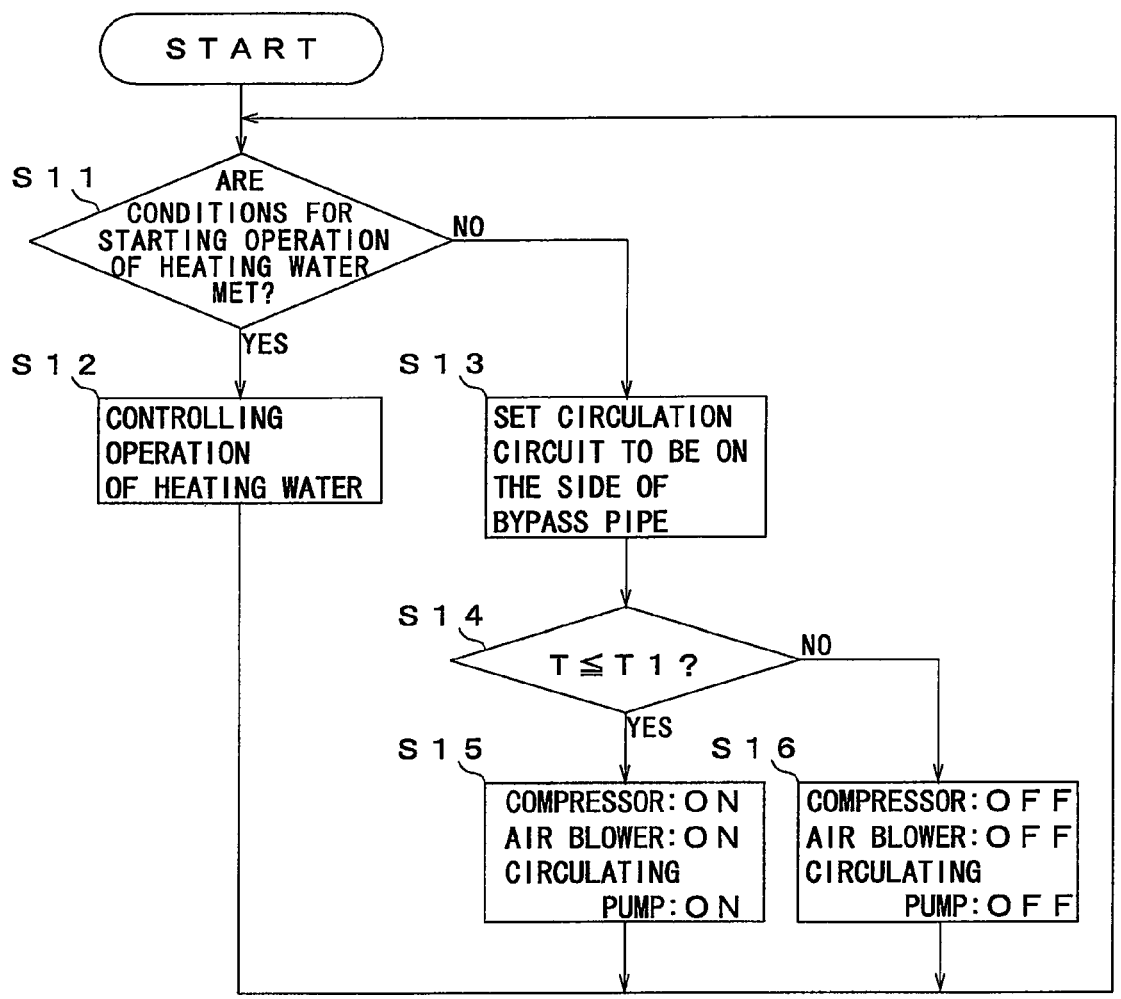
FIG. 3 is a flow chart illustrating operation of a controller with respect to operation of preventing freezing.

Here, operation of the controller 40 with respect to operation of preventing freezing will be described referring to a flow chart in FIG. 3.

First, when conditions for starting operation of heating water (for example, when the time reaches a preset time, or when an amount of the remaining hot water in the hot water storage tank 21 is smaller than a predetermined amount) are met (step S11), operation of heating water is performed to store hot water at a predetermined temperature in the hot water storage tank 21 by the predetermined amount (step S12). Further, when the conditions for starting operation of heating water are not met (step S11), the circulation circuit 30 is set to be on the side of the bypass pipe 35 by operating the channel switching valve 35 (step S13), and the compressor 11 is operated at the second operating frequency, and operation of preventing freezing is performed by driving the air blower 14a and the circulating pump 31 (step S15) in the case where the detection temperature T of the temperature sensor 41 is equal to or lower than a set temperature T1 (step S14). Further, in the case where the detection temperature T of the temperature sensor 41 is higher than the set temperature T1 (step S14), the compressor 11, the air blower 14a and the circulating pump 31 are stopped (step S16). Also, in the case where the detection temperature T of the temperature sensor 41 is equal to or lower than the set temperature T1 (step S14), the compressor 11 is operated at the second operating frequency, and during operation of preventing freezing in which the air blower 14a and the circulating pump 31 are operated (step S15), operation of heating water is started (step S12) and the compressor 11 is operated at the first operating frequency when the conditions for starting operation of heating water are met (step S11).

During operation of preventing freezing, the compressor 11 is continuously operated except when the detection temperature T of the temperature sensor 41 becomes higher than the set temperature T1 because the compressor 11 is operated at the second operating frequency having a lower frequency and heating power is low.

As described above, according to the hot water supply apparatus of the present embodiment, except during operation of heating water, the circulating pump 31 is operated and the compressor 11 is operated at the second operating frequency having a lower frequency than the first operating frequency when the detection temperature T of the temperature sensor 41 becomes equal to or lower than the set temperature T1, so that the compressor 11 does not have to be repeatedly operated and stopped, and can be continuously operated in a state of reduced heating power, which allows reduction in energy consumption.

Further, except during operation of heating water, the circulation circuit 30 is set to be on the side of the bypass pipe 34 by the channel switching valve 35, and therefore water at a low temperature circulating within the circulation circuit 30 can be prevented from flowing into the hot water storage tank 21, which allows a temperature of hot water stored in the hot water storage tank 21 to be prevented from lowering.

In addition, the embodiment described above has disclosed the apparatus including: the bypass pipe 34 for bypassing the hot water storage tank 21 in the circulation circuit 30; and the channel switching valve 35 for switching the channel of the circulation circuit 30 to the side of the hot water storage tank 21 or to the side of the bypass pipe 34, but the bypass pipe 34 and the channel switching valve 35 are not provided, and a flow rate of water within the circulation circuit 30 is decreased during operation of preventing freezing, and hot water heated to a predetermined temperature in the gas cooler 12 is made to flow into the hot water storage tank 21, thereby the temperature of hot water stored in the hot water storage tank 21 can be also prevented from lowering.

The embodiments described herein are exemplary and not restrictive. The scope of the invention is specified in the appended claims, and all modifications included in the range of the claims fall into the scope of the present invention.

The invention claimed is:

1. A hot water supply apparatus, comprising:
    an electric compressor (11),
    a high-pressure side heat exchanger (12),
    an expansion mechanism (13),
    a low-pressure side heat exchanger (14),
    a refrigerant circuit (10a) to which the compressor (11), the high-pressure side heat exchanger (12), the expansion mechanism (13) and the low-pressure side heat exchanger (14) are connected,
    a hot water storage tank (21) for storing hot water,
    a circulation circuit (30) having a supply pipe (32) for connecting the hot water storage tank (21) and a water inflow side of the high-pressure side heat exchanger (12), and a return pipe (33) for connecting a water outflow side of the high-pressure side heat exchanger (12) and the hot water storage tank (21),
    a circulating pump (31) provided in the circulation circuit (30),
    a temperature sensor (41) for detecting a temperature in a space where the circulation circuit (30) is installed, and
    a controller (40) for operating the circulating pump (31) and operating the compressor (11) at a rotation speed for operation of preventing freezing lower than a rotation speed region of the compressor (11) during operation of heating water when a detection temperature (T) of the temperature sensor (41) becomes equal to or lower than a predetermined temperature (T1), except during operation of heating water to store hot water heated in the high-pressure side heat exchanger (12), in the hot water storage tank (21).

2. A hot water supply apparatus according to claim 1, further comprising:
    a bypass pipe (34) for bypassing a hot water storage tank (21) in a circulation circuit (30),
    a channel switching valve (35) for switching a channel in the circulation circuit (30) to the side of the hot water storage tank (21) or to the side of the bypass pipe (34), and
    a controller (40) for setting the circulation circuit (30) to be on the side of the bypass pipe (34) by using the channel switching valve (35), except during operation of heating water.

* * * * *